CAM OPERATED PULSE TRANSMITTING DEVICE

Filed Jan. 11, 1965 5 Sheets-Sheet 1

CAM OPERATED PULSE TRANSMITTING DEVICE

July 2, 1968 P. R. L. MARTY 3,391,251
CAM OPERATED PULSE TRANSMITTING DEVICE
Filed Jan. 11, 1965 5 Sheets-Sheet 5
FIG.5.
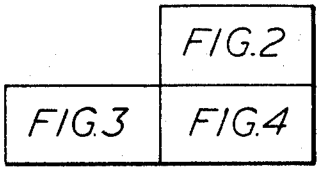
FIG.2
FIG.3 FIG.4
FIG.6.
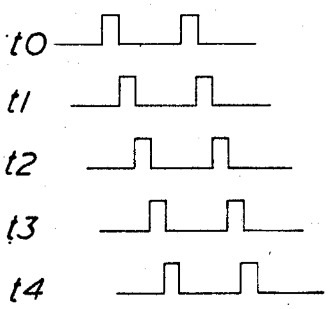
FIG.7.
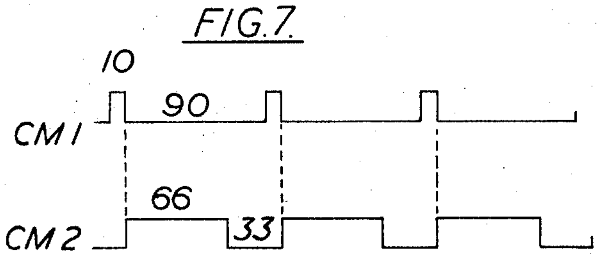

United States Patent Office 3,391,251
Patented July 2, 1968

3,391,251

CAM OPERATED PULSE TRANSMITTING DEVICE

Pierre René Louis Marty, Paris, France, assignor to International Standard Electric Corporation, New York, N.Y., a corporation of Delaware Filed Jan. 11, 1965, Ser. No. 424,861
2 Claims. (Cl. 179—18)

ABSTRACT OF THE DISCLOSURE

A device for sending calibrated pulses. The device is used in a junctor comprising one simplified electromechanical part (line wires and emitting relays), memories, and, a logic circuit common to the junctors for a group. The device comprises a control cam and a sending cam that are synchronized. The logic circuit uses the first control-cam current generating period for starting the pulse sending device, and it uses the next current generating periods for counting the pulses emitted. When there is concordance between the number of pulses sent and the digit registered upon the memories, the logic circuit blocks the sending device.

The present invention relates to pulse transmitting devices for use in selection systems for circuits or electrical equipment, and more particularly, to such devices for use in automatic telephone exchanges of the semi-electronic type that use electromechanical switching apparatus for the speech circuits and electronic components such as diodes and transistors for the control circuits.

In U.S. Patent No. 3,242,255, which issued on Mar. 22, 1966, and is assigned to the assignee of this invention, the local junctor or feeder, inserted between two selection chains on the calling party's side and the called party side has, as essential functions: sending of tones as well as of ringing current, supplying current to the subscribers' sets and holding of both chains in seized condition. Being of a simplified type, it comprises only: the line wires, the relays that send the various tones as well as ringing current, and, current-supplying relays; the other functions habitually performed by the feeder, are transferred to equipments comprising electronic components. A certain number of memories made up of ferrite tores or cores, are assigned to every feeder; and, there is described, in particular, a "sequential" switch, the position of which characterizes the stage of operation as well as the elements for storing the conditions of subscriber-line (line opened or looped). A logic circuit, common to a group of feeders successively, scans the said feeders as well as the tores with which they are associated. At every stage of operation the logic circuit takes notice of information given by the memories and by the contacts of the various relays; it draws all useful conclusions, commands the necessary operations and brings the memories up to date. The various feeders are scanned in cyclical manner, one logic circuit operates in succession for each of them as per the "time-division multiplex system." The stepping of the scanner is controlled by a chain of binary counters or "address scanner."

The outgoing and incoming junctors are designed according to same principle as the local junctors or feeders. It is possible to find, in a group served by a same logic circuit: local junctors, outgoing junctors and incoming junctors.

Systems are known wherein the feeder does not have its own proper tores. When a feeder is put into service, an arrangement of tores or "memory compartment" is assigned to it, by writing its number in the said compartment; thus, more efficient use is made of the entire arrangement of tores. When the logic circuit scans the compartments by means of a first scanner, it reads the feeder number and causes a second scanner to connect to this feeder. It is then able to assemble all the information elements needed for making a decision. The various memory compartments are grouped into "blocks" and they are scanned sequentially inside every block, in a cyclical manner; whereas the junctors are scanned at the request of the logic circuit, according to the numbers read in the memory compartments.

In other known systems a block of memories is provided for handling a determined amount of traffic. An individual logic circuit, particular to each block, scans in cyclical way the various compartments of the block, but it performs only simple operations such as the re-writing of the information read. In complicated cases it refers to a central logic circuit, common to all the blocks. Thus an economy in equipment is realized while a reasonable time duration is maintained for the scanning cycle.

The present invention relates more particularly to a device for transmitting dial impulses corresponding to a directory number stored in a memory compartment. In prior art systems, the logic circuit sends, during each scanning of the compartment, a "sample of a signal" which acts upon the transmitting relay through a transistor. A time-delay device (condenser) enables the relay to remain in position during the time separating two successive scanning operations. According to a variant, a bistable circuit is triggered by means of the first sample of signal in order to control the operation of the transmitting relay. A time-counter, set into the logic circuit, resets the bistable circuit and ends the transmission of the signal at the expiration of a determined lapse of time. Thus signals calibrated with precision are obtained.

An object of this invention is a device for sending trains of impulses corresponding to a digit registered in memories. The device comprises: a control cam and a synchronized sending cam, a memory for displaying the control cam—that is for preparing to put it into service—a memory for noting the first current generating period of the control cam, also memories making up a counter of transmitted impulses, and a logic circuit. The entire arrangement is such that, at a first stage, the logic circuit finding the control cam providing an output during a cam current generating period, notes this period upon the appropriate memory and starts the impulse-sending device. In a second stage the logic circuit ascertains a new cam-current generating period and makes the counter of transmitted impulses step forward one step by comparing the new position of this counter with the registered digit, the same process repeating itself for the next control cam-current generating periods. In a third stage, the logic circuit ascertains the concordance between the position of the counter and the position of the registered digit, and effectively turns off the impulse sending device.

According to another feature of the invention, the supervision compartments of a memory block are scanned in cyclical manner and the individual logic circuit normally performs, upon each one of them, only the reading and re-writing operations. The central logic circuit is called only if simultaneously the control cam is displayed upon the appropriate memory and current generating period of this cam occurs.

According to another feature of the invention the central logic circuit, being called, stops the cyclical scanning, connects itself onto the considered memory block, starts a reading writing cycle, and if it ascertains a first control-cam current generating period, it notes down this period and acts upon the junctor designated by the scanner via a gate particular to the group of the junctors utilizing the block of memories. The line wires of the interautomatic circuit are routed onto a current generator through contacts under the control of the sending cam. A full pulse is transmitted before the next control-cam current generating-period takes place.

According to another feature of the invention, when the central logic circuit detects a new control cam current generating period, it starts a first reading writing cycle and makes the counter of transmitted impulses step forward by a step; and in a second reading writing cycle, it compares the new position of the counter with the digit registered.

According to another feature of the invention, when the central logic circuit during the second reading writing cycle ascertains that there is a concordance between the position of the counter and the number registered, it acts once more upon the junctor by putting the pulse sending device out of service and cancels all the indications existing on the various memories.

According to another feature of the invention, the duration of a pulse from the control cam coincides with the duration of a cyclical scanning of all the compartments of a memory block, in such way that when there is a control cam current generating period, this cam period is found once and once only whatever be the compartment scanning instant in the cycle.

According to another feature of the invention, an impulse from the sending cam takes place between two successive control-cam current generating periods in order to avoid truncating the impulses transmitted by the junctor.

According to a variant, another feature of the invention is to apply the above described process to the sending of cadenced pulses upon an interautomatic circuit with the purpose of giving all appropriate signaling (for instance, called subcriber's replacing of handset) this sending of cadenced impulses will go on until the logic circuit ascertains the reception of a signal originating from the distant end (signal of release, for instance).

According to a second variant, another feature of the invention is to provide only the control-cam. The arrangement being such that when the central logic circuit ascertains a current generating period of this cam it acts upon the junctor by commanding, according to cases, either a beginning of pulse sending or an end of pulse sending.

Other objects and features of the invention will become apparent from the description that follows, given by way of a nonlimiting example, in conjunction with the accompanying drawings comprising FIGS. 1 to 7 wherein:

FIG. 5 is a drawing for the assembling of FIGURES 2, 3 and 4;

FIG. 6 is a diagram of the control pulses originated by the time alloter;

FIG. 7 is a diagram of the pulses originated by control cam and sending cam.

Figure 1:
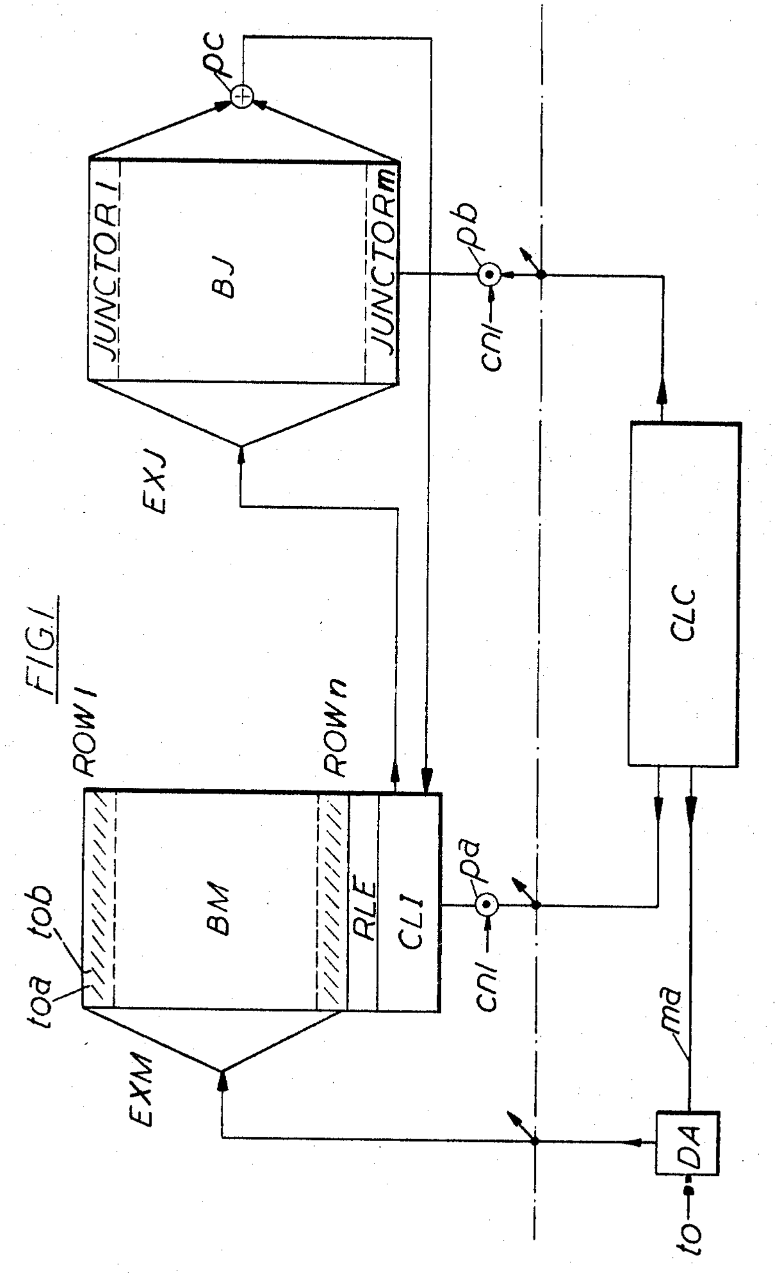
FIG. 1 is the block diagram of a semi-electronic telephone system.

*Symbols.*—The ferrite cores or tores used in the memory blocks are shown by small slanted strokes (FIG. 1, tores *toa, tob*).

The electronic scanner associated with each memory block or with each group of junctors (EXM, EXJ) is shown by a triangle; the inlet corresponds to the top of the triangle marked with an arrow, and the various outlets are arranged on the side opposite.

The gates, as per a notation inspired from Boole's algebra, are shown by little circles with a dot inside each one ("AND" gate) or with a cross inside each one ("OR" gate).

The bistable circuits, such as *ba* (FIG. 3), are shown by two juxtaposed rectangles containing the digits 1 and 0. The incoming wires are placed at the upper part and bear an arrow indicating the incoming direction of the control signal; the outgoing wires *ba*1 and *ba*0 are placed at the lower part. Normally, this bistable is in position 0, a characteristic potential (−12 v., for instance) being delivered upon wire *ba*0. For making this bistable pass onto position 1, a control signal is sent upon the incoming left wire, the characteristic potential is then switched from wire *ba*0 onto wire *ba*1. To restore the bistable into its initial position, a control signal is sent upon incoming right wire.

The monostable circuits, such as *ba'* (FIG. 4), are shown in similar way, but the compartment 1 is crossed by a diagonal. The stable position is supposed to be 0.

The binary counters, such as *bf* (FIG. 3), are shown by two juxtaposed rectangles having two diagonals. The incoming wire of the counter is placed on its right; the outgoing wires *bf*1 and *bf*0 are placed at the lower part. Normally such a counter is in position 0, a characteristic potential being delivered upon wire *bf*0. To have this counter step forward onto position 1, an impulse of determined direction is sent upon incoming wire; the characteristic potential is then switched from wire *bf*0 onto wire *bf*1. If a new impulse of same direction is sent upon incoming wire, the counter steps forward another step and then resets to position 0, since it happens to be a binary counter having only two positions. In order to place the counter into position 0—whatever may be its initial condition—a control signal is sent upon wire *ebf*0; to bring it into position 1, a signal is sent upon wire *ebf*1.

By associating $n$ binary counters, a counter is obtained comprising $2^n$ positions; every binary counter in restoring to rest condition will send onto the next counter an impulse which makes this counter step forward by one step. Thus, for instance, the counter constituted by the four elements *bc* . . . *bf* enables to obtain $2^4=16$ positions. By convention, one would say that a counter happens to be in position 0 when all the binary counters which make it up are themselves in position 0.

The amplifiers (*aa, aa'*) are shown by means of small sized triangles.

*General layout of the equipments.*—When a junctor is in service, a free memory compartment—or a supervision compartment such as compartment No. 1 (FIG. 1)—is immediately temporarily assigned to it. This compartment as essentially made up of a certain number of ferrite tores *toa, tob* . . . . There is provided, in fact, a tore for indicating whether the compartment is free or occupied; and upon other tores are found: the junctor number associated with the compartment, the sequential switch indicating the stage of operation, the condition of calling line (open or looped), the condition of the called subscriber's line and various other information. In practice, another compartment is also associated with the junctor for registering the digits dialled by the calling subscriber; however, for simplification purposes, it will be assumed that these digits are present in the supervision compartment. The various compartments 1 to $n$ constitute a memory block BM. A telephone exchange may include several blocks BM, each of them being assigned to a determined group of junctors. Since the junctors of a group are not all busy at the same instant, the number of compartments of a memory block may be less than the number of junctors. By way of example, it is possible to constitute groups able to contain up to 384 junctors, and this corresponds to a traffic of about 2000 subscriber lines, each group being associated with a memory block of 250 compartments.

To scan the various compartments of the memory block BM, an address scanner DA is provided, essentially made up of a chain of several binary counters, each one of them making the next one step forward by a step when it restores to rest condition. In such conditions, it is possible to obtain $2^n$ combinations by using only *n* binary counters. Impulses *t0* cause the stepping forward of the first counter of the chain. The binary indications originated by the address scanner are decoded by any well-known means, such as diode or resistor matrices, so as to apply a characteristic potential upon one determined wire, and one only, for every position of the address scanner. This decoding device constitutes the scanner EXM. In general, this scanner progresses forward step by step under control of the address scanner, that is to say, it scans the various memory compartments sequentially in cyclical manner. It can be stopped and put back into operation by the central logic circuit CLC (wire *ma*).

The reading and writing register RLE is essentially made up of bistable circuits; for every position of the scanner EXM, it dispays the binary information read or to be written in the corresponding compartment.

The individual logic circuit CLI is particular to each memory block. For every position of the scanner EXM, it takes notice of the indications displayed upon the register RLE. If there is no particular operation to be performed it limits itself in commanding simply and solely the re-writing of all the information read; otherwise it refers to the central logic circuit CLC.

The central logic circuit CLC is common to all the memory blocks BM of the exchange. It may temporarily connect itself onto one of them by means of a gate *pa* particular to that block and rendered conducting by the condition *cn*1; it then takes notice of all the useful elements of information and then provides the necessary orders.

The junctors No. 1 to *m*, which use the memory block BM, have been grouped into an arrangement BJ associated with the scanner EXJ. This latter is placed under the control of the individual logic circuit CLI. When a definite supervision compartment is being scanned, this logic circuit takes notice of the junctor number temporarily associated with the said compartment and directs the scanner EXJ onto this junctor. The junctor sends all the necessary information to the individual logic circuit CLI through an "OR" gate *pc*. The individual logic circuit that is otherwise aware of condition of the supervision compartment tores, possesses all the elements which enable it to make a decision; according to cases, it commands simple and solely the writing over again of the indications read, or it calls the central logic circuit. The latter can act upon the junctor designated by the scanner EXJ through the medium of an "AND" gate *pb* particular to the block BJ, and rendered conducting by the condition *cn*1 already mentioned.

Figure 2:
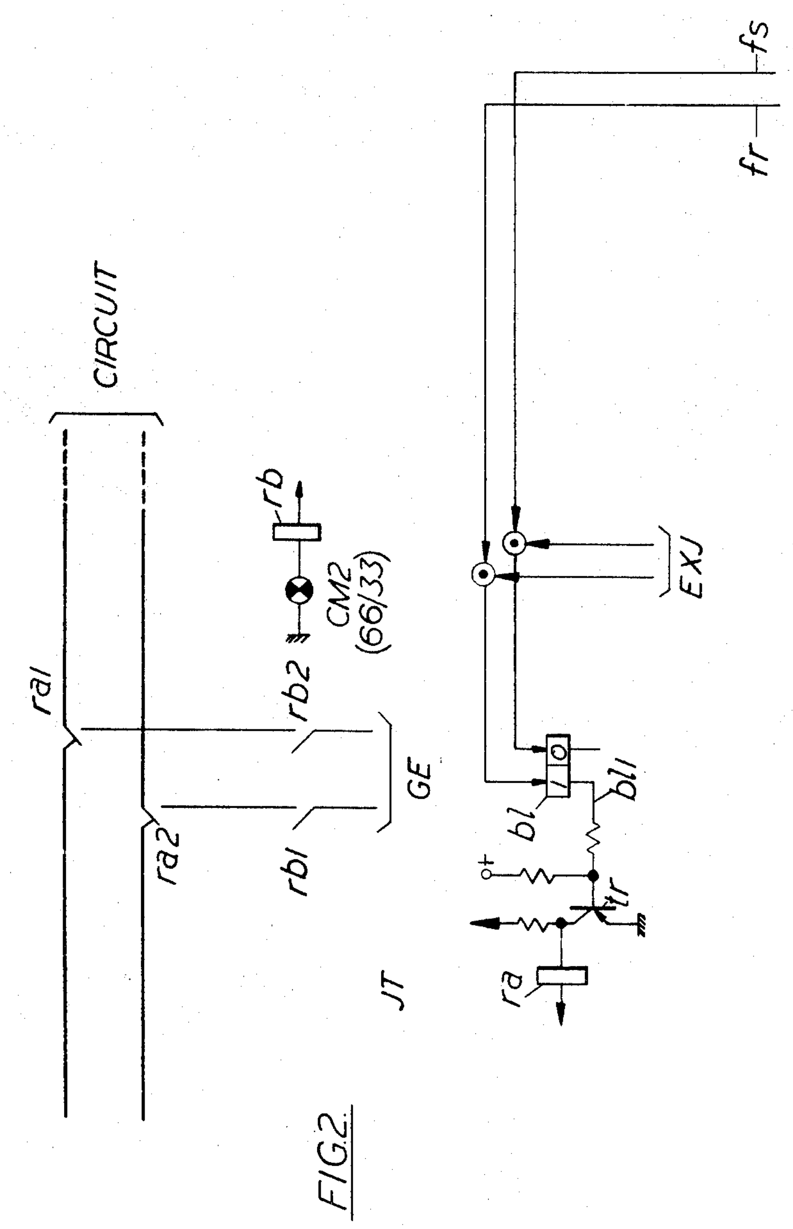
FIG. 2, illustrates the circuit elements—which are necessary for the better understanding of the present invention—of an outgoing junctor for the circuit connecting two remote exchanges.
Figure 3:
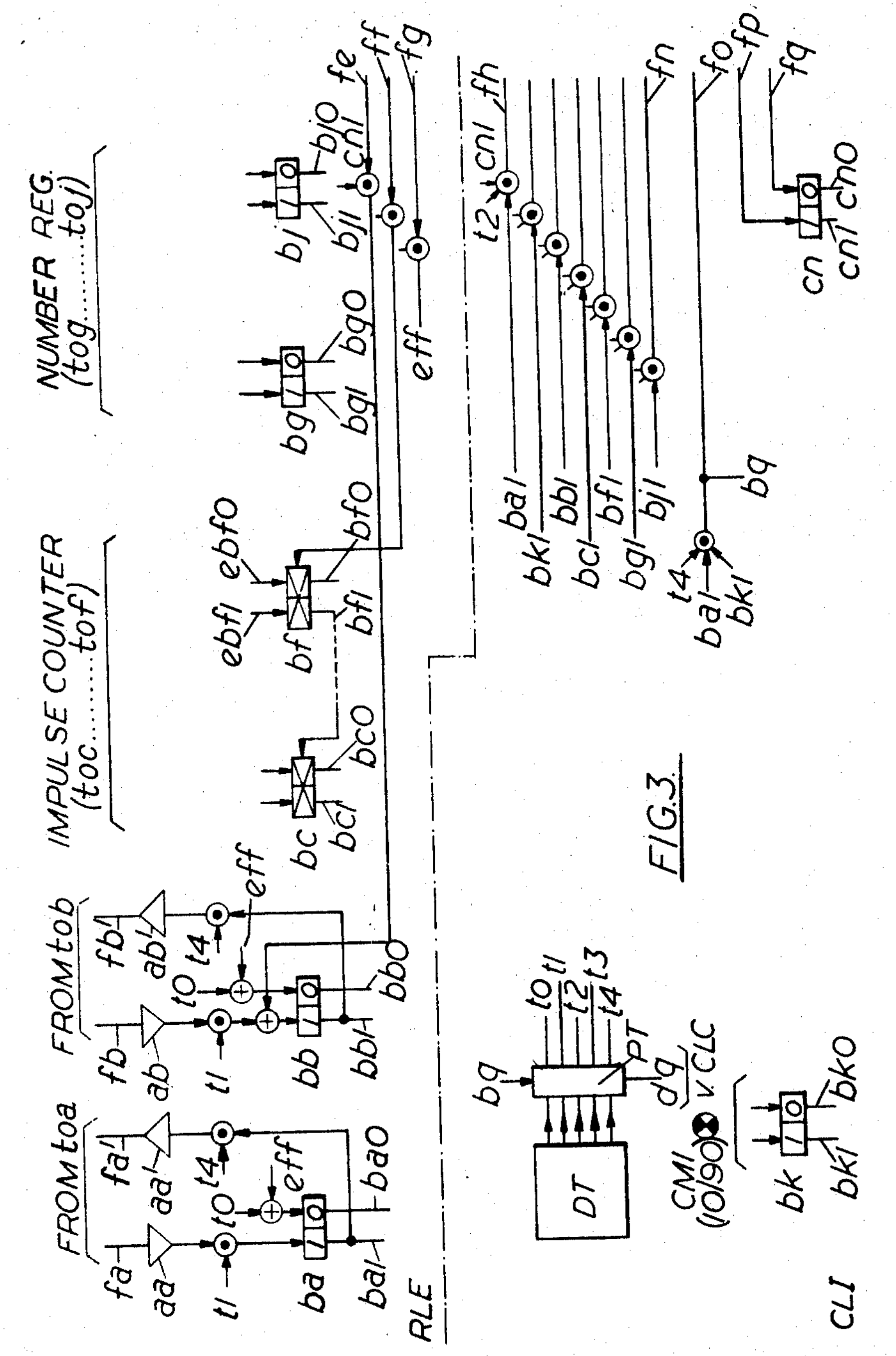
FIG. 3 illustrates circuit elements of the reading and writing register and of the individual logic circuit.
Figure 4:
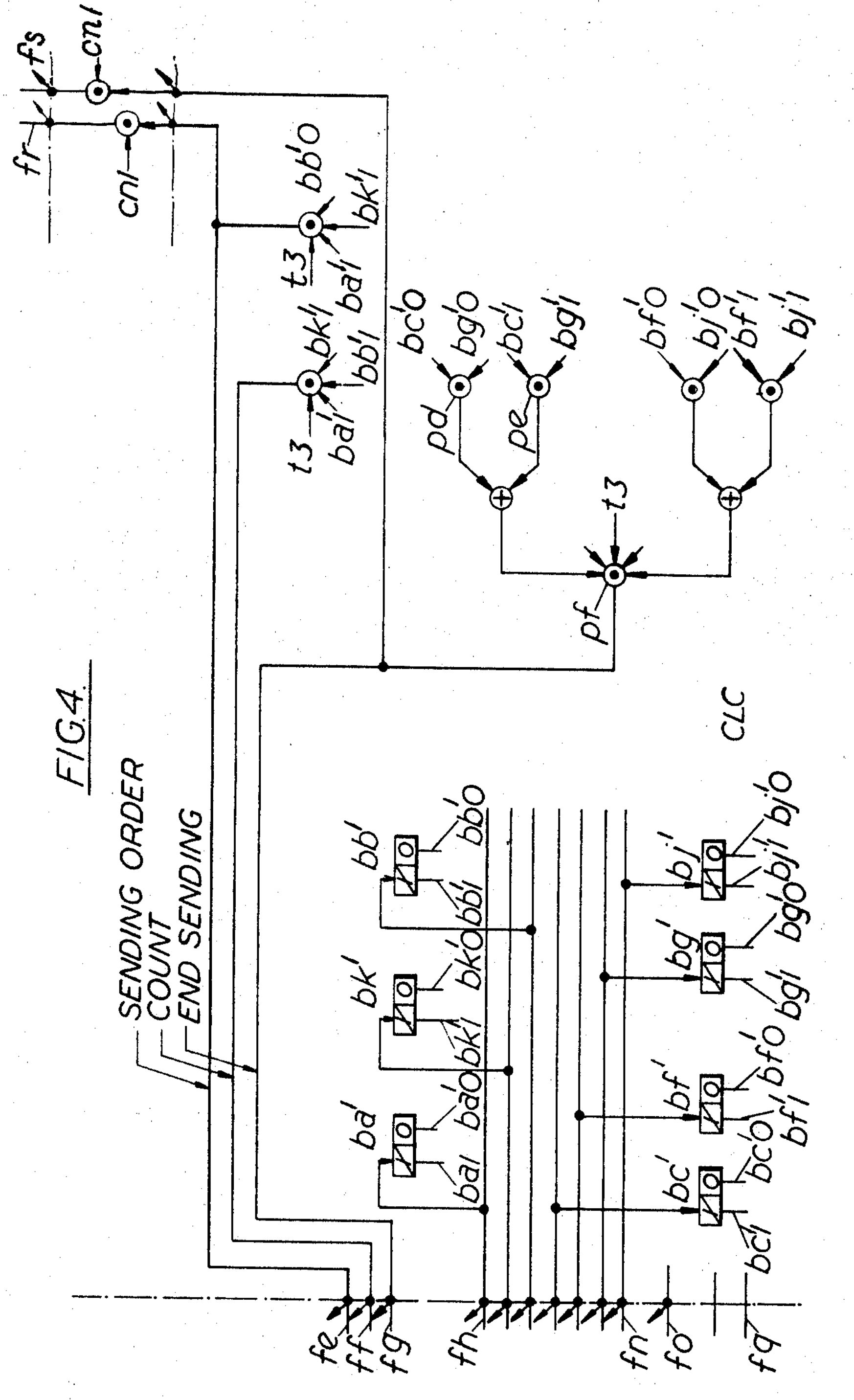
FIG. 4 illustrates elements of the central logic circuit.

In FIGURES 2, 3, 4 assembled together as indicated in FIG. 5, there is shown the components necessary for understanding the present invention in the circuit elements of: outgoing junctor JT, reading and writing register RLE, individual logic circuit CLI and central logic circuit CLC. The wires such as *fa* and *fa'*, placed at the upper part of FIG. 3, are connected onto the memory blocks. The wire *fa* is used for the reading of tore *toa* of the compartment designated by the scanner; the wire *fa'* is used for writing an information on this same tore. Amplifiers *aa*, *aa'* are respectively inserted upon these two wires. The bistable *ba* displays the binary information read or to be written upon this tore. Similar arrangements are provided for the circuits corresponding to the other tores *tob, toc . . . tof, tog . . . toj*; but, for simplification purposes, the full circuits are shown only for tores *toa* and *tob*.

The outgoing wires *fh . . . fn* are provided for the transmission of information from the individual logic circuit CLI onto the central logic circuit CLC; the wires *fe . . . fg* are used for the transmission of orders provided by the central logic circuit.

The various operations which must be performed upon each memory compartment are regulated by a time alloter DT. The latter delivers pulses, distanced the ones from the others, at instants *t0 . . . t4* (FIG. 6). The instant *t0* is assigned to the setting into place of the address scanner and to the restoring to rest condition of the reading and writing bistables; the instant *t1* is assigned to the reading; the instant *t2* is assigned to the transmission of information onto the central logic circuit; the instant *t3* is assigned to the reception of the orders originating from the central logic circuit; finally, the instant *t4* is reserved for the writing operations as well as for the calling of the central logic circuit. The impulses *t0 . . . t4* are delivered through gates PT placed under the control of the central logic circuit.

By way of example, the duration of every one of the impulses *t0 . . . t4* may be of 4 microseconds, which results in a time alloter cycle of $4 \times 5 = 20$ microseconds. The address scanner DA (FIG. 1) steps forward by a step at each impulse *t0*, that is to say every time the time alloter DT starts a new cycle.

*Sending a digit to the looped circuit.*—The digit sent is supposed to be registered on the 4 tores *tog . . . toj*. These tores enable to obtain $2^4 = 16$ combinations, which is enough for storing a digit included between 0 to 9.

When the junctor happens to be the sending-of-registered-digit position, the tore indicating the condition of the control cam, or tore *toa*, is in position 1; the other tores are in 0.

When the scanner reaches the level of the supervision compartment which is temporarily assigned to the junctor, the time alloter DT delivers in succession the control impulses *t0 . . . t4*. The gates PT are supposed to be unblocked. The impulse *t0* orders the restoring to 0 of the reading bistable *ba*. At the instant *t1*, and "AND" gate associated with reading wire *fa* is unblocked in order to copy upon the bistable *ba* the position of tore *toa;* and this tore being in position 1, *ba* passes to the 1 condition. At the instant *t4*, the "AND" gate inserted upon writing wire *fa'*, is unblocked; thus, the position of the bistable *ba* is copied on the tore *toa*, which simply amounts to re-writing the information read beforehand. Similar operations are effected upon the other tores. The bistable *ba* delivers a characteristic potential upon wire *ba*1, preparing thus the calling of the central logic circuit.

The cycle of the reading and writing over again takes place by means of the same process, at each scanning operation until the control-cam current generating period CM1 occurs. As shown on FIG. 7, this cam delivers pulses periodically. The duration of a pulse must coincide with the duration of a scanning cycle of the memory block in such way as to find once, with certainty, and once only, the current generating period of this cam during the cycle—whatever may be the instant of scanning of the compartment in the cycle. By way of example, the duration of a scanning cycle has been chosen as being of 10 milliseconds; the cam CM1 delivers therefore pulses of 10 milliseconds separated by intervals of 90 milliseconds. The cam CM1, controls the bistable *bk* (FIG. 3), so as to have this bistable be in position 1 during the cam current generating period, and to be in 0 the remainder of the time. This can be accomplished by having the cam operate a relay during its current generating period. Contacts on the relay could operate bistable *bk*.

When the supervision compartment, considered here, is scanned during the control cam current generating period CM1, the cycle of reading and of re-writing takes place once more as was previously mentioned; but, since the bistable *bk* happens to be in 1, the central logic circuit CLC is being called through an "AND" gate unblocked by the signals *t4*, *ba*1, *bk*1, energizing wire *fo*. At the same time, the gates PT are blocked by means of a signal on wire *bq*, so as to stop the reading and writing operations until a reply is received from the central logic circuit.

The central logic circuit stops the cyclical scanning, serves other memory blocks—if need be—and then it connects itself onto the block considered here, by having the bistable *cn* pass onto position 1 with the help of a signal on wire *fp*. In supplying the signal *cn*1, this bistable prepares the circuits of information-interchanging between the individual logic circuit and the central logic circuit.

The central logic circuit unblocks once more the gates PT by means of a signal on wire *dq*, in order to command a new reading and writing cycle. The restoring to rest condition of the bistables, as well as the reading operation, are performed as already mentioned above. Whereas, at the instant *t*2, the indications of position of bistables are transmitted onto the central logic circuit through the wires *ba*1, *bk*1, *bb*1 and the "AND" gates are unblocked by signals *t*2 and *cn*1. In the central logic circuit, these indications are written upon the monostables *ba'*, *bk'*, *bb'*, during a lapse of time long enough to enable the accomplishment of the logic functions. At the instant under consideration, *ba'* and *bk'* pass to 1, but *bb'* remains in 0. At the instant *t*3, a sending command signal is transmitted from the central logic circuit onto the outgoing junctor JT through an "AND" gate unblocked by the signals *t*3, *ba'*1, *bk'*1, *bb'*0; another "AND" gate particular to the group of junctors under consideration is unblocked by signals *cn*1, and on wire *fr*; a third "AND" gate is unblocked by junctor-scanner EXJ and the bistable *bl*. This latter passes to the 1 state and delivers upon outgoing wire *bl*1 a negative potential which saturates the transistor *tr*. The relay *ra* operates, preparing by means of its make contacts, *ra*1 and *ra*2, the sending of impulses upon the circuit.

As shown on FIG. 7, the sending cam CM2 transmits pulses of 66 milliseconds, separated by intervals of 33 milliseconds. It is arranged in such manner that the beginning of a pulse occurs after the control cam current generating period CM1 so as not to truncate the sending of the first pulse, whatever may be the instant of scanning of the considered compartment in the cycle. The cam CM2 acts upon the relay *rb* which commands the sending of pulses through its make contacts *rb*1, *rb*2 and by means of generator GE. Of course, numbers 66 and 33 for the sending-cam CM2, have only been chosen as an example, because they normally correspond to the pulses habitually transmitted on the circuits; it being merely necessary that cams CM1 and CM2 should have same periods (100 milliseconds in the example described here.)

The sending command signal, transmitted by the central logic circuit, acts also upon the reading and writing register, through the following circuit: "AND" gate unblocked by the signals *t*3, *ba'*1, *bk'*1, *bb'*0, wire *fe*, "AND" gate unblocked by the signal *cn*1, "OR" gate, bistable *bb*. This latter passes to the 1 condition.

At the instant *t*4, the information read on tores *toa*, *toc* . . . *tof*, *tog* . . . *toj* are written over again as already indicated above. On tore *tob* there is written the information figuring upon the bistable *bb*, that is to say, 1. Thus the tore *tob* registers the first control-cam current generating period.

After the transmission of the sending-command signal, the monostables, *ba'* and *bk'* restore to 0; the central logic circuit disconnects itself from the considered memory block by commanding, through wire *fq*, the restoring to 0 of the connection bistable *cn*. It then sets going once more the cyclical scanning of the supervision compartments.

When the supervision compartment considered here is being scanned at second control-cam current generating period CM1, the counting of the first sent pulse would be started. The reading and writing cycle, as well as calling of the central logic circuit, are performed—as mentioned above—during the first control-cam current generating period CM1. The central logic circuit connects itself onto the memory block considered here (bistable *cn* in 1) and it unblocks the gates PT, by means of wire *dq*, in order to start a new reading and writing cycle.

After restoring bistables *ba*, *bb*, *bg* . . . *bj* and binary counters *bc* . . . *bf* to rest condition, the tores are read and indications of the corresponding positions are transmitted onto the central logic circuit by means of wires *ba*1, *bk*1, *bb*1, *bc*1 . . . *bf*1, *bg*1 . . . *bj*1 at the instant *t*2; and are then registered upon the monostables *ba'*, *bk'*, *bb'*, *bc'* . . . *bf'*, *bg'* . . . *bj'*. From the respective positions of the first three monostables, the central logic circuit deduces that there has already been a sending of at least one pulse and that it is necessary to begin the counting of the last pulse sent. At the instant *t*3, a counting pulse is transmitted from the central logic circuit onto the reading and writing register through the following circuit: gate "AND" unblocked by the conditions *t*3, *ba'*1, *bb'*1, *bk'*1, wire *ff*, "AND" gate unblocked by the signal *cn*1, incoming wire of the binary counter *bf*. The latter passes to the 1 state. At the instant *t*4, the indications read upon the tores *toa*, *tob*, *tog* . . . *toj* are written over again; the number 0001 is writen upon tores *toc* . . . *tof* in order to indicate that there has already been a sending of a pulse. Then, the various monostables of the central logic circuit restore to position 0.

As shown on the diagram in FIG. 7, the second control cam current generating period CM1, that is to say, the counting of the first sent pulse, takes place during a period of silence of the sending cam CM2, whatever may be the considered instant of scanning of supervision compartment inside the 10 milliseconds cycle. A pulse is therefore only accounted for when it has been fully sent.

The central logic circuit remains seized and a new reading writing cycle is provided with the purpose of comparing indications written on the sent-impulses-counting-tores with the registered number. At the time *t*2, the indications of position of the various bistables and of binary counters are transmitted unto the central logic circuit as already indicated above. It will be assumed that there exists a discordance between these two indications; in that case, the central logic circuit performs no particular operation and disconnects itself from the memory block considered. The cyclical scanning starts once more.

In the juncture JT, the relay *rb* continues operating under the control of the cam CM2, and sending of pulses is carried on. Each new pulse sent makes the counter *bc* . . . *bf* step forward by a step and is thus accounted for upon tores *toc* . . . *tof*, as is already mentioned above.

After sending of the last pulse corresponding to the registered number, there is concordance between indications figuring, on one hand, upon the tores *toc* . . . *tof*, and on the other hand, upon the tores *tog* . . . *toj*; the central logic circuit will detect this concordance during the second reading writing cycle. The monostables *bc'* and *bg'* being both either in position 0 or in position 1, one of the two "AND" gates *pd*, *pe* is unblocked; there, therefore, is a sending of a signal upon one of the inlets of the "AND" gate *pf*. Same applies concerning respective positions of the other monostables, and in particular of *bf'* and *bj'*. The gate *pf* is therefore unblocked at instant *t*3; there is, therefore, a transmission of an end-of-pulse-sending signal through the following circuit: gate *pf*, "AND" gate unblocked by the signal *cn*1 and being particular to group of junctors considered, wire *fs*, "AND" gate unblocked by the scanner EXJ, bistable *bl*. The bistable *bl* restores to postion 0 and has a ground substituting for the negative potential upon the outgoing wire *bl*1; thus, the transistor *tr* gets blocked and the relay *ra* releases, putting out of circuit the generator GE by means of its make contacts *ra*1, *ra*2.

The end-of-sending signal provided by the central logic circuit is also transmitted onto the reading and writing register through the following circuit: gate *pf*, wire *fg*, "AND" gate unblocked by the signal *cn*1, cancelling wire *eff*, "OR" gate, right inlet of bistable *ba*. Similar circuits are completed by the bistable *bb*, the bistables *bg* . . . *bj* and the binary counters *bc* . . . *bf*; all these elements are therefore restored to position 0. At instant

*t*4, an 0 is written therefore upon all the tores *toa, tob, toc . . . tof, tog . . . toj*. The next digit is sent as per a similar process.

The pulse sending process already described above is interesting in that it enables the transmission of pulses carefully calibrated, and that it only causes the central logic circuit to intervene at the beginning of sending operation. The operating process of the junctor is simple; the sending of pulses once started, will go on up to the end without any intervention of the central logic circuit.

Another advantage of the system is that one may have several types of pulses to send, according to nature of the circuits (impulses 66/33 and 50/50, for instance); of course it is necessary to provide a sending cam for each type of impulse, but a single control cam is enough providing that all these pulses have the same period (100 milliseconds in the case of impulses 66/33 and 50/50).

According to a variant, is is possible to modify the shape of the control cam CM1 so as to cause intervention by the central logic circuit at the beginning and at the end of every pulse; this circuit would then command the energizing of *ra* at the beginning of each pulse and its release at the end of each pulse. The relay *rb* and the sending cam CM2 are no longer necessary. To know whether it has to start a beginning or an end of pulse sending, the central logic circuit may count the control-cam current generating periods, perform for instance a beginning of pulse sending for the cam periods which are even, and an end of impulse sending for the odd periods. It is also possible to provide a control cam giving alternately pulses of various directions.

The present invention is liable to receive a certain number of applications. Thus, for instance, in the toll automatic telephone systems, it is customary—in order to signal the called subscriber's replacing of receiver—to send cadenced impulses or "bombardment" from the incoming junctor onto outgoing junctor; this sending of impulses coming to an end when the release signal originating from the outgoing junctor is received. The sending of these cadenced impulses can be performed, as has already been indicated above, for sending a train of dial impulses, but there is no longer any accounting of the impulses; the sending ceases when release signal is received.

I claim:

1. A circuit for transmitting pulses from junctors to called lines,
- said pulses corresponding to stored directory numbers received from calling lines,
- the circuit comprising memory means associated with said lines for storing said directory numbers,
- logic circuit means common to said junctors for controlling said pulse transmitting circuit,
- control cam means providing recurring current generating periods,

- transmitting cam means having the same repetition frequency as said control cam means for controlling the transmitting of said pulses,
- sending means operated under the control of said logic means when said pulses are to be transmitted,
- said sending means comprising bistable means operated responsive to the current generating period of said control cam means,
- switching means operated to conduct current responsive to the conduction of current of said switching means for connecting said transmitting cam means to said called lines to send pulses,
- means for counting the current number of said transmitted pulses,
- means for comparing said number with the stored directory number,
- and means responsive to said stored directory number and the number of said transmitted pulses being equal for resetting said bistable means to open said switching means and return said relay means to normal so as to disconnect said transmitting cam means.

2. An electronic switching system having a circuit for transmitting stored dial pulses, said circuit comprising outgoing lines,
- a control cam and a sending cam having the same repetition periods,
- a memory compartment associated with each of said lines,
- said compartment comprising a plurality of cores with one first set of cores making up a sending counter and a second set of cores for storing said dial pulse to be transmitted, and dial pulse sending means, comprising means responding to a first current-generating period of the control cam for connecting the sending cam onto the lines, means responding to the subsequent current-generating periods of the control cam for causing said sending counter to step, and means for comparing the number from the stepped sending counter with a dial pulse to be transmitted and means operating responsive to the count of said sending counter and said dial pulse being equal for disconnecting the sending cam from the line and resetting the cores.

References Cited

UNITED STATES PATENTS

| | | | |
|---|---|---|---|
| 2,923,777 | 2/1960 | Schneider | 179—27.1 |
| 3,201,519 | 8/1965 | Schmitz | 179—18 |
| 3,231,680 | 1/1966 | Yamato et al. | 179—18.61 |
| 3,024,315 | 3/1962 | Faulkner | 179—18 |
| 3,301,963 | 1/1967 | Lee et al. | 179—18 |

KATHLEEN H. CLAFFY, *Primary Examiner.*

L. A. WRIGHT, *Assistant Examiner.*